(12) United States Patent
Godfrey

(10) Patent No.: US 11,500,426 B2
(45) Date of Patent: Nov. 15, 2022

(54) DISPLAY SYSTEM

(71) Applicant: Lenovo (Singapore) Pte. Ltd., Singapore (SG)

(72) Inventor: Cyan Godfrey, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/209,445

(22) Filed: Mar. 23, 2021

(65) Prior Publication Data

US 2022/0308621 A1 Sep. 29, 2022

(51) Int. Cl.
*G06F 1/16* (2006.01)

(52) U.S. Cl.
CPC ............ *G06F 1/166* (2013.01); *G06F 1/1637* (2013.01); *G06F 1/1681* (2013.01); *G06F 1/1686* (2013.01)

(58) Field of Classification Search
CPC ...... G06F 1/166; G06F 1/1637; G06F 1/1684; G06F 1/1686
See application file for complete search history.

(56) References Cited

U.S. PATENT DOCUMENTS

| | | | | |
|---|---|---|---|---|
| D337,104 S | * | 7/1993 | Orchard | D14/375 |
| 5,683,064 A | * | 11/1997 | Copeland | A47B 21/0314 248/160 |
| 5,887,723 A | * | 3/1999 | Myles | G06F 1/1628 206/320 |
| 5,923,528 A | * | 7/1999 | Lee | F16M 11/105 361/679.07 |
| 6,061,104 A | * | 5/2000 | Evanicky | F16M 11/18 248/274.1 |
| D428,411 S | * | 7/2000 | Poole | D14/337 |
| 6,105,919 A | * | 8/2000 | Min | F16M 11/2014 248/418 |
| 6,216,989 B1 | * | 4/2001 | Shioya | F16M 11/10 248/122.1 |
| 6,268,998 B1 | * | 7/2001 | Cho | G06F 1/1601 248/917 |
| D453,509 S | * | 2/2002 | Kazamaki | D14/336 |
| 6,366,452 B1 | * | 4/2002 | Wang | F16M 11/10 248/125.1 |
| 6,430,038 B1 | * | 8/2002 | Helot | G06F 1/1616 248/917 |
| 7,652,873 B2 | * | 1/2010 | Lee | G06F 1/1681 248/920 |
| 7,686,275 B2 | * | 3/2010 | Scarcello | F16M 11/14 248/231.91 |
| 7,744,055 B2 | * | 6/2010 | Zeng | F16M 13/005 248/447 |
| D623,638 S | * | 9/2010 | Richardson | D14/250 |
| D623,639 S | * | 9/2010 | Richardson | D14/250 |
| 7,836,623 B2 | * | 11/2010 | Wang | H04N 1/00562 248/458 |
| 8,230,992 B2 | * | 7/2012 | Law | G06F 1/1626 248/176.1 |

(Continued)

*Primary Examiner* — Adrian S Wilson
(74) *Attorney, Agent, or Firm* — Brian J. Pangrle

(57) ABSTRACT

A system can include a display housing that includes a display surface and edges that define a centroid; a stand that includes a first portion, a second portion and a hinge assembly that couples the first portion and the second portion; and a turntable coupling, offset from the centroid, that rotatably couples the first portion of the stand to the display housing.

19 Claims, 14 Drawing Sheets

(56) References Cited

U.S. PATENT DOCUMENTS

| | | | | |
|---|---|---|---|---|
| 8,282,060 B2* | 10/2012 | Fan | F16M 11/041 | 361/679.21 |
| 8,607,976 B2* | 12/2013 | Wu | G06F 1/1626 | 248/458 |
| 8,746,449 B2* | 6/2014 | Gallagher | F16M 13/04 | 206/320 |
| 8,892,238 B2* | 11/2014 | Sweet | B24B 29/02 | 700/164 |
| 8,934,232 B2* | 1/2015 | Hsu | G06F 1/1662 | 361/679.56 |
| 9,110,630 B2* | 8/2015 | Cakir | H04B 1/3888 | |
| 9,131,756 B2* | 9/2015 | Hurst | A45C 11/00 | |
| 9,215,303 B2* | 12/2015 | Nyholm | H04M 1/11 | |
| 9,241,422 B2* | 1/2016 | Hsu | G06F 1/1662 | |
| D750,089 S * | 2/2016 | Langhein | A45C 11/00 | D14/447 |
| 9,377,810 B2* | 6/2016 | Hishinuma | G06F 1/1613 | |
| 9,496,102 B2* | 11/2016 | Bates | H01H 13/86 | |
| 10,063,268 B2* | 8/2018 | Gygax | G06F 1/1626 | |
| 10,739,827 B2* | 8/2020 | Choi | F16M 11/2021 | |
| 10,955,873 B1* | 3/2021 | Godfrey | H05K 5/0017 | |
| 10,996,714 B1* | 5/2021 | Godfrey | G06F 1/1607 | |
| 2003/0021083 A1* | 1/2003 | Landry | G06F 3/0338 | 361/679.06 |
| 2004/0224732 A1* | 11/2004 | Lee | H04M 1/0247 | 455/566 |
| 2005/0057893 A1* | 3/2005 | Homer | G06F 1/16 | 361/679.29 |
| 2007/0014084 A1* | 1/2007 | Jobs | F16M 11/40 | 361/679.22 |
| 2008/0016742 A1* | 1/2008 | Hao | F16M 13/02 | 40/753 |
| 2010/0225429 A1* | 9/2010 | Tsai | H01F 7/0247 | 335/219 |
| 2011/0221319 A1* | 9/2011 | Law | G06F 1/1626 | 16/337 |
| 2012/0037285 A1* | 2/2012 | Diebel | G06F 1/1626 | 206/320 |
| 2012/0044638 A1* | 2/2012 | Mongan | G06F 1/1616 | 361/679.55 |
| 2012/0176741 A1* | 7/2012 | Wu | G06F 1/1686 | 361/679.28 |
| 2012/0217174 A1* | 8/2012 | Ting | G06F 1/1628 | 206/45.2 |
| 2019/0212785 A1* | 7/2019 | Choi | F16M 11/125 | |
| 2019/0361502 A1* | 11/2019 | Bai | G06F 1/1616 | |
| 2020/0285276 A1* | 9/2020 | Lin | G06F 1/1622 | |
| 2020/0363840 A1* | 11/2020 | Hurst | G06F 1/1654 | |
| 2021/0132656 A1* | 5/2021 | Godfrey | H04M 1/04 | |

* cited by examiner

DISPLAY SYSTEM

TECHNICAL FIELD

Subject matter disclosed herein generally relates to technology for computing systems.

BACKGROUND

Various types of display systems can include one or more housings. For example, a tablet computing system (e.g., a tablet) can have a single housing with a display and a notebook computing system (e.g., a notebook) can have two housings where one of the housings is a display housing and the other one of the housings is a keyboard housing where the two housings are coupled by a hinge assembly.

SUMMARY

A system can include a display housing that includes a display surface and edges that define a centroid; a stand that includes a first portion, a second portion and a hinge assembly that couples the first portion and the second portion; and a turntable coupling, offset from the centroid, that rotatably couples the first portion of the stand to the display housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
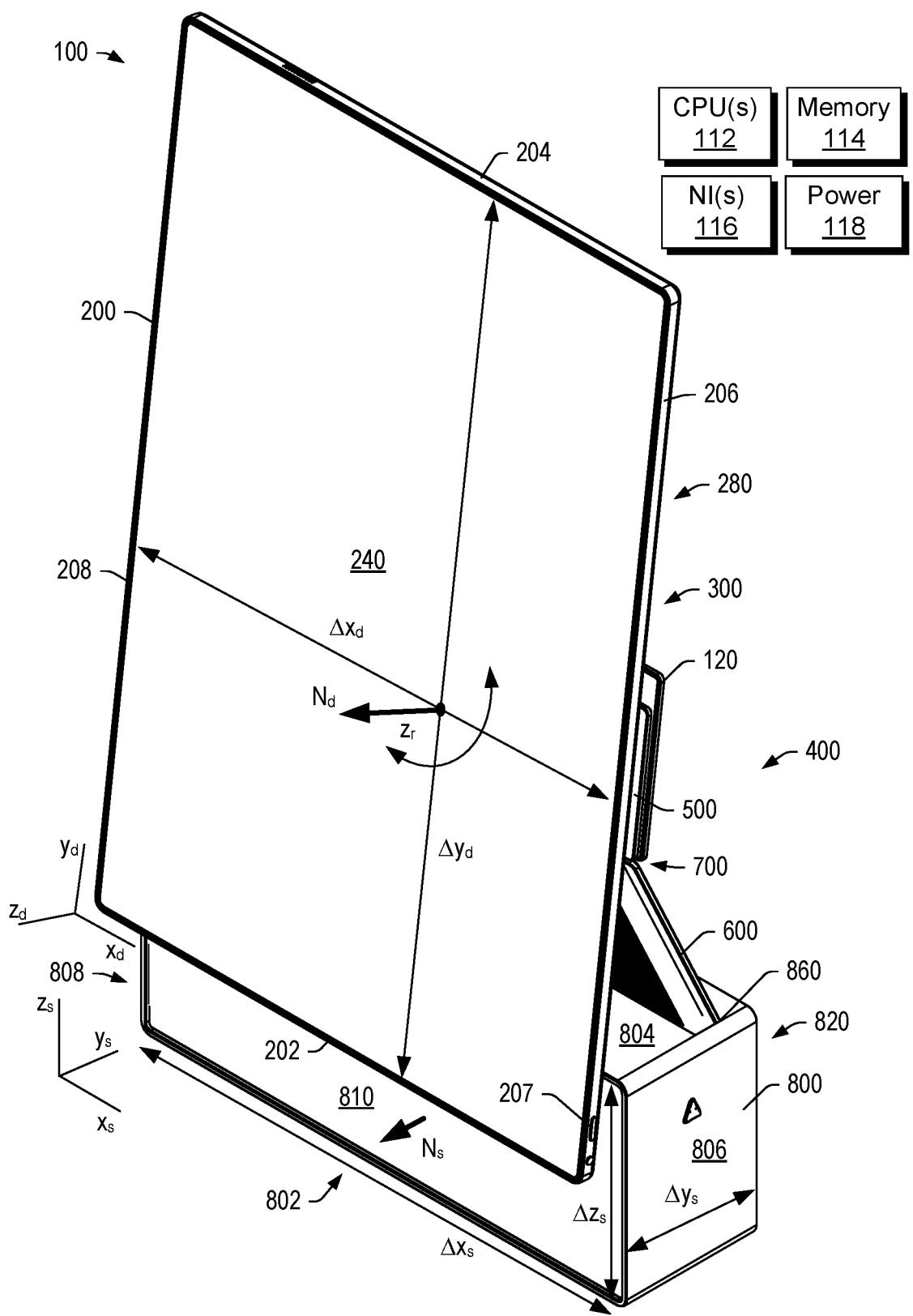
FIG. 1 is perspective view of an example of a system.

FIG. 1 shows a perspective view of an example of a system 100 that includes a display housing 200, a turntable coupling 300 that couples the display housing 200 to a stand 400 and optionally a base 800 that can support the stand 400 and hence, indirectly, the display housing 200. In such an example, the base 800 may be removable such that the display housing 200 and the stand 400 can be utilized to support the display housing 200 at a suitable angle. For example, consider a fixed angle, an adjustable angle and/or a selectable angle. As an example, the display housing 200 and the stand 400 may be utilized in combination with the base 800 where they are physically coupled or, for example, where they are physically separated. For example, consider utilizing circuitry of the display housing 200 and/or the stand 400, when the display housing 200 and the stand 400 are physically coupled, to wirelessly couple to circuitry of the base 800. As an example, a wired approach may be utilized, for example, where a cable or cables may couple circuitry where the display housing 200 and the stand 400 are or are not physically supported by the base 800. In the example of FIG. 1, the system 100 may be referred to as a display system.

As shown, the display housing 200 can be defined at least in part via a Cartesian coordinate system ($x_d$, $y_d$ and $z_d$) where a display surface 240 can be defined, for example, via dimensions $\Delta x_d$ and $\Delta y_d$, which can define a display area. As shown, the display housing 200 includes edges 202, 204, 206 and 208 (e.g., side edges) where, for example, a power button 207 may be positioned on one of the side edges (e.g., near a lower right hand corner that may transition to being an upper right hand corner upon a 90 degree counter-clockwise rotation of the display housing 200 such that a user knows the power button 207 will be near a right hand corner, whether lower or upper). In the example of FIG. 1, the display surface 240 can be a front surface of a front side of the display housing 200 and an opposing surface of an opposing side 280 can be a back surface of the display housing 200 where a person may view rendering that appear on the display surface 240. The display housing 200 can include one or more types of display circuitry (e.g., LED-based, etc.) and may include touch-sensing circuitry, digitizer circuitry, etc.

As an example, the turntable coupling 300 may be defined with respect to an axis, shown as $z_r$, which may be aligned with a normal vector $N_d$ defined by the display surface 240 (e.g., where the display surface 240 is planar). As indicated by a curve with a double-headed arrow, the display housing 200 can be rotatable about the axis $z_r$ via the turntable coupling 300. In such an example, rotation can be, for example, by 90 degrees where a 90 degree rotation in a counter-clockwise (CCW) direction can transition the display housing 200 (e.g., shown in FIG. 1 as being rectangular with one planar dimension greater than another) from a portrait orientation to a landscape orientation (e.g., a portrait mode to a landscape mode) and vice versa (e.g., via a 90 degree clockwise rotation from the landscape orientation to the portrait orientation).

In the example of FIG. 1, the stand 400 includes a first portion 500, a second portion 600 and a hinge assembly 700 that couples the first portion 500 and the second portion 600. As shown, the first portion 500 can be coplanar with a back side plane of the display housing 200 where the second portion 600 can be adjustable such that it may be coplanar with the back side plane of the display housing 200 or disposed at an angle (e.g., selectable, adjustable, etc.). In such an example, the back side plane can be substantially coplanar with the $x_d,y_d$-plane of the display surface 240. In the example of FIG. 1, the display housing 200 may be referred to as being a display or monitor for rendering of information, graphics, images, etc., for viewing by a user or users. As an example, the display housing 200 and/or the display housing 200 and the stand 400 and/or the display housing 200, the stand 400 and the base 800 may be an "all-in-one" type of computing device or computing system.

As mentioned, the second portion 600 of the stand 400 may be disposed at an angle, as shown in the example of FIG. 1. In such an example, the second portion 600 may be supported by the base 800 such that the base 800 can physically support the display housing 200 via the stand 400.

In the example of FIG. 1, the base 800 includes opposing sides 802 and 804, opposing sides 806 and 808, and opposing sides 810 and 820 where, for example, the side 802 can be a bottom side, the side 804 can be a top side, the side 806 can be a right hand side, the side 808 can be a left hand side, the side 810 can be a front side and the side 820 can be a back side. As shown, the base 800 may be defined at least in part by various dimensions such as, for example, dimensions $\Delta x_s$, $\Delta y_s$ and $\Delta z_s$, which may define a volume of the base 800 as well as area of one or more of the sides. As shown, the side 810 may be planar and define a normal vector $N_s$. In the example of FIG. 1, the base 800 has an orientation such that the front side 810 is facing generally frontward as is the display surface 240. As an example, the base 800 may include features that provide for support of the display housing 200 and the stand 400 in one or more orientations. For example, consider mounting features on multiple sides of the base 800, which may allow for supporting the display housing 200 and the stand 400 in various manners, optionally with various features of the base 800 (e.g., circuitry features, etc.).

In the example of FIG. 1, the side 804 of the base 800 includes a slot 860 that can receive the second portion 600 such that the base 800 can support the stand 400 and the display housing 200. In such an example, the base 800 can support the display housing 200 via the stand 400 with the display housing 200 in a portrait orientation as shown or, for example, in a landscape orientation where the display housing 200 is rotated by 90 degrees about the axis $z_r$. As mentioned, consider a counter-clockwise (CCW) rotation of the display housing 200 by 90 degrees about the axis $z_r$.

As an example, the system 100 may include one or more processors 112, memory 114 (e.g., one or more memory devices), one or more network interfaces 116, and one or more power cells 118. One or more instances of such components may be, for example, housed within or otherwise coupled to one or more of the display housing 200, the stand 400 and the base 800. FIG. 1 also shows an optional keyboard 120 that may be coupled to the first portion 500 of the stand 400, for example, for storage where it may be deployed, for example, to be positioned in front of the display housing 200 on a support surface on a user's lap, etc. As an example, the keyboard 120 may include a rechargeable battery or batteries where circuitry of the stand 400 may provide for charging (e.g., via a wired connection, a wireless connection such as the Qi standard, etc.). Where a display system includes one or more processors and memory, it may be referred to as a computing system (e.g., a display system with circuitry suitable for performing computing tasks such as, for example, establishing an operating system environment for execution of applications, etc.).

Figure 2:
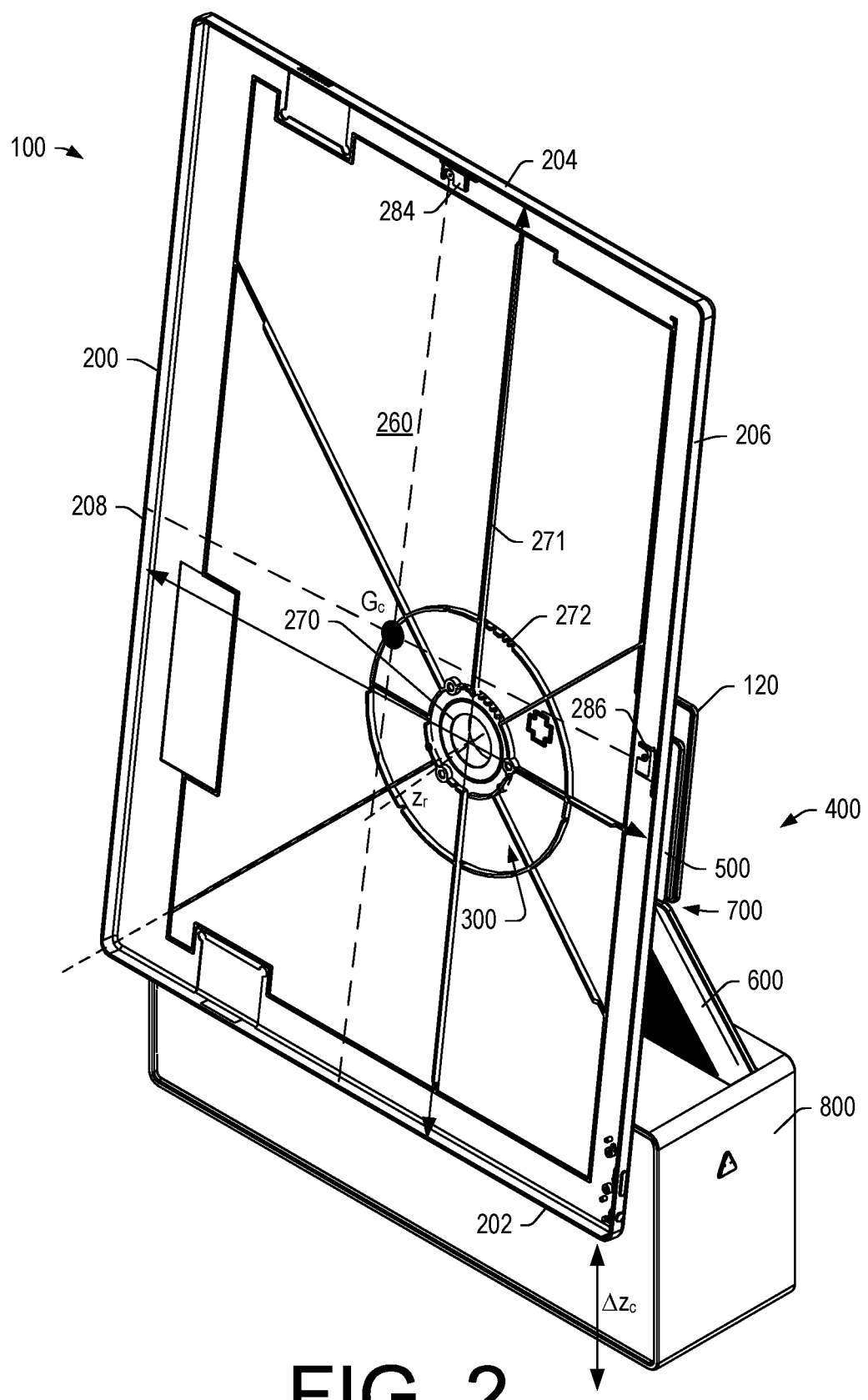
FIG. 2 is perspective view of a portion of the system of FIG. 1.

FIG. 2 shows the system 100 of FIG. 1 without the display surface 240 to expose a plate 260 of the display housing 200, which can include an opening 270 for routing of one or more wires and various ribs 271 and 272, which may provide for structural support and may include one or more notches, etc., for example, for purposes of routing one or more wires, etc. (e.g., as may be operatively coupled to one or more types of circuitry carried by the display housing 200).

As shown, the axis $z_r$ is not at the geometric centroid of the display housing 200, rather it is offset from the geometric centroid ($G_c$), as indicated by a black marker in FIG. 2. As explained, the display housing 200 can be rectangular with one dimension differing from another dimension (e.g., $\Delta y_d > \Delta x_d$). In the example of FIG. 2, a line is shown passing through the lower left corner of the display housing 200 where the line can be at a 45 degree angle with respect to an edge of the display housing 200. As shown, the opening 270 can be centered at a point along the line where the point does not coincide with the geometric centroid ($G_c$). As explained, a display housing can include edges that define a centroid that is a geometric centroid ($G_c$). For example, the display housing 200 includes edges 202, 204, 206 and 208 that can define a rectangle where the rectangle has a geometric centroid ($G_c$). As explained, in various examples, depending on the positioning of a turntable coupling with respect to a display housing, upon rotation by 90 degrees, a lowermost edge of the display housing may be at approximately the same height. For example, a lowermost edge in a portrait orientation and a lowermost edge in a landscape orientation may be at approximately the same height (e.g., within 2 cm or less). Where a display surface is centered with respect to the display housing, a centerline of the display surface may be approximately the same in a portrait orientation and in a landscape orientation (e.g., consider a bezel-less display housing or an approximately even bezeled display housing where at least opposing side bezels are approximately equal).

In the example of FIG. 2, also shown are camera units 284 and 286 where the camera unit 284 is proximate to the edge 204 and the camera unit 286 is proximate to the edge 206. In such an example, the camera unit 284 is positioned at the center top of the display housing 200 and, upon rotation of the display housing 200 by 90 degrees counter-clockwise, the camera unit 286 will be positioned at the center top of the display housing 200. As an example, the display housing 200, the turntable coupling 300 and/or the stand 400 can include circuitry that can detect an orientation of the display housing 200, for example, as being in a portrait orientation or a landscape orientation such that an appropriate one of the camera units 284 and 286 is activated and that rendering to the display surface 240 is properly oriented. As shown, the edge 202 can be a distance from a support surface (e.g., a desktop, a countertop, a tabletop, etc.) as may be indicated by the dimension $\Delta z_c$ where the display housing 200 may be rotated CCW by 90 degrees without contacting the support surface. For example, the distance from the support surface to the axis $z_r$ can be greater than the distance from the axis $z_r$ to the corner defined by the edges 202 and 208.

Figure 3:
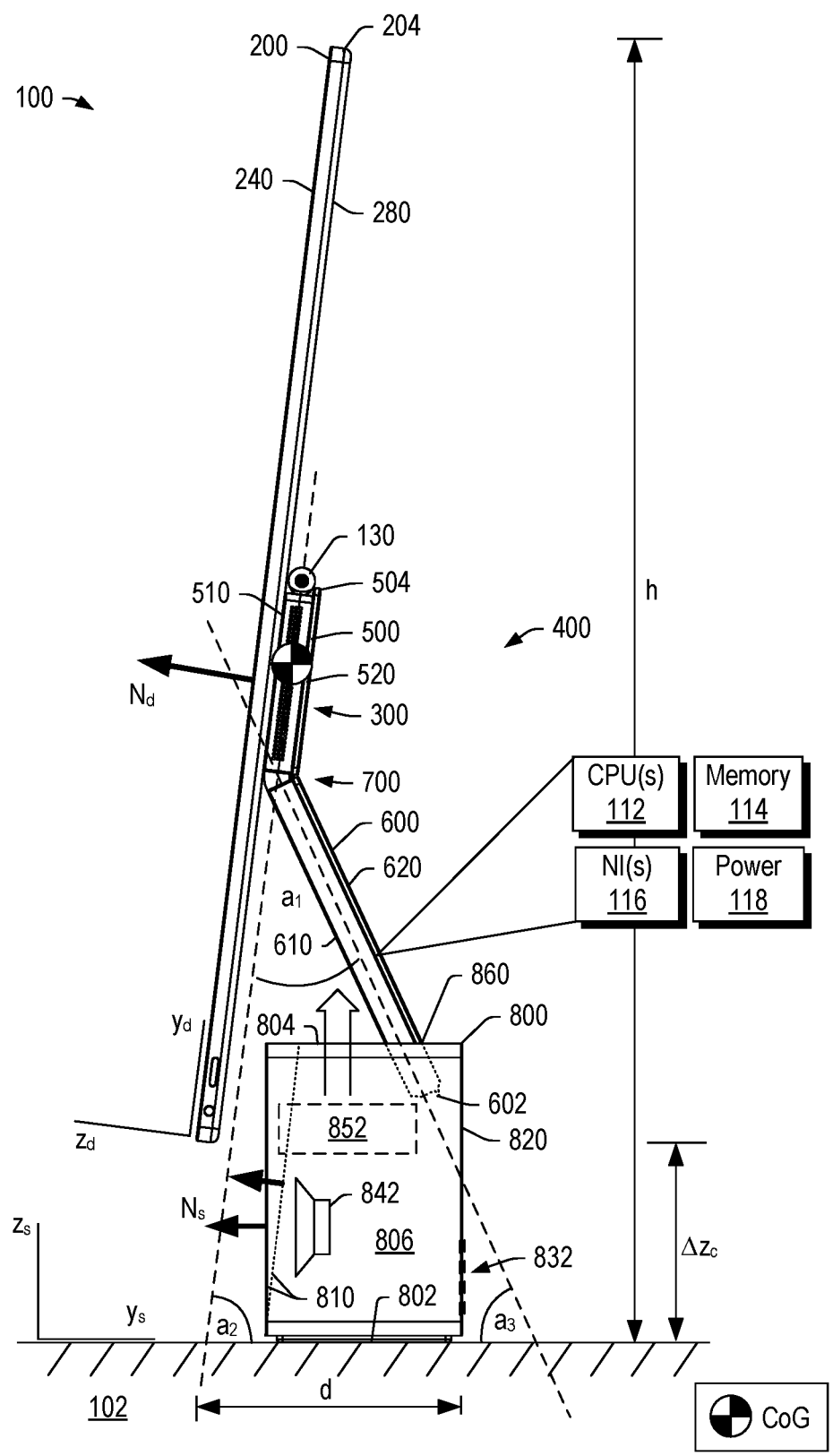
FIG. 3 is a side view of the system of FIG. 1.

FIG. 3 shows a side view of the system 100 along with various dimensions such as a height h and a depth d. In the example of FIG. 3, an approximate location of a center of gravity (CoG) or center of mass (CoM) is shown, which can be at a location that is above the base 800 (e.g., a footprint of the base 800, etc.) and disposed more toward the front side 810 of the base 800 rather than the back side 820 of the base. As to the depth d, it is less than approximately 50 percent of the height h in the portrait orientation shown in FIG. 3. The relatively short depth d can correspond to a relatively small footprint such that the system 100 does not occupy an inordinate amount of work surface space. For example, the system 100 may be part of a "clean desk" scheme.

In the example of FIG. 3, the stand 400 may be defined by various angles, which may be angles of a triangle that includes three legs where a support surface 102 or the side 802 of the base 800 may form the triangle. Where the base 800 is not utilized as a support for the stand 400, a triangle may still be defined where, for example, the edge 202 of the display housing 200 is in contact with the support surface 102 and a lower edge 602 of the second portion 600 is in contact with the support surface 102. In yet another orientation, a triangle may be formed by the edge 204 of the display housing and the edge 602 of the second portion being in contact with the support surface 102 (e.g., consider a relatively low angle drawing mode or creative content mode where the normal vector $N_d$ is angled more upwardly). In the example of FIG. 3, the triangle is shown along with internal angles labeled $a_1$, $a_2$ and $a_3$. In such an example, the angle $a_2$ may be utilized to define an angle of the display surface 240, for example, as may be viewable to a user or users. As shown, the angle $a_2$ is approximately 83 degrees. As an example, the angle $a_2$ may be adjustable via the hinge assembly 700. For example, consider tilting the display housing 200 via the hinge assembly 700 to tilt the display housing 200 backwards (e.g., a lesser angle) or to tilt the display housing 200 forwards (e.g., to a greater angle). As an example, the display housing 200 may be adjustable (e.g., to adjust the normal vector $N_d$) such that the angle $a_2$ can be greater than or equal to approximately 90 degrees and less than approximately 60 degrees (e.g., consider adjusting the display housing 200 to be substantially parallel to the support surface 102).

As mentioned, the keyboard 120 may be included and, for example, hooked onto an edge 504 of the first portion 500 of the stand 400 for storage, which may provide for charging a rechargeable battery of the keyboard 120 (e.g., via wired and/or wireless circuitry). In the example of FIG. 3, a stylus 130 is shown as being stored with respect to the first portion 500 of the stand 400, for example, via an interference fit, a clip, one or more magnets, etc. In such an example, the stylus 130 may be an active stylus that includes one or more batteries that may be chargeable via circuitry of the first portion 500 of the stand 400 (e.g., wired and/or wireless circuitry). As an example, the Qi standard as to wireless charging (e.g., energy transfer) technology may be utilized.

As shown in FIG. 3, the first portion 500 includes opposing sides 510 and 520 where the side 510 faces the surface of the side 280 of the display housing 200, which can be a back side of the display housing 200. The turntable coupling 300 may be an interface where a portion of the turntable coupling 300 couples to the display housing 200 and a portion of the turntable coupling 300 couples to the first portion 500 of the stand 400. As explained, the turntable coupling 300 may be a turntable type of joint where the display housing 200 can rotate in a plane about the axis $z_r$ of the turntable coupling 300, for example, to transition between portrait and landscape orientations. As shown in FIG. 3, the second portion 600 includes opposing sides 610 and 620 where the side 610 can include one or more openings, which may provide for heat transfer. For example, consider the one or more openings as being in fluid communication with ambient air such that heat may emanate from circuitry of the second portion 600 outwardly and/or such that ambient air may flow through the one or more openings to the circuitry of the second portion 600 to help transfer heat energy away from the circuitry. As shown, the second portion 600 may include circuitry such as, for example, one or more of the one or more processors 112, the memory 114, the one or more network interfaces 116 and the power source 118.

In the example of FIG. 3, the base 800 is shown as including one or more components such as, for example, one or more connectors 832, one or more speakers 842, one or more fans 852, etc. As shown, the one or more connectors 832 may be on the side 820 and the one or more speakers 842 may be directed toward the surface of the side 810, which may be at 90 degrees or another angle and include one or more openings for audio waves to emanate from the base 800. As to the one or more fans 852, the side 804 can include one or more openings such that air moved by the one or more fans 852 can flow, for example, toward the side 610 of the second portion 600 of the stand 400 as positioned with respect to the base 800.

In the example of FIG. 3, the second portion 600 of the stand 400 can include one or more contacts that can contact one or more contacts of the base 800, for example, to provide for transfer of data, instructions, power, etc. For example, where the base 800 includes the one or more fans 852, a heat sensor in the second portion 600 may be utilized to control operation of the one or more fans 852. As another example, where the second portion 600 includes an audio processor as one or more of the processors 112, audio signals may be transmitted to the base 800 for production of sound by the one or more speakers 842; noting that the base 800 and/or the stand 400 may include wireless circuitry such as, for example, BLUETOOTH circuitry, WiFi circuitry, etc. As an example, the base 800 may include features to operate as a wireless speaker, which may be a wireless portable speaker that can pair with one or more types of devices.

Figure 4:
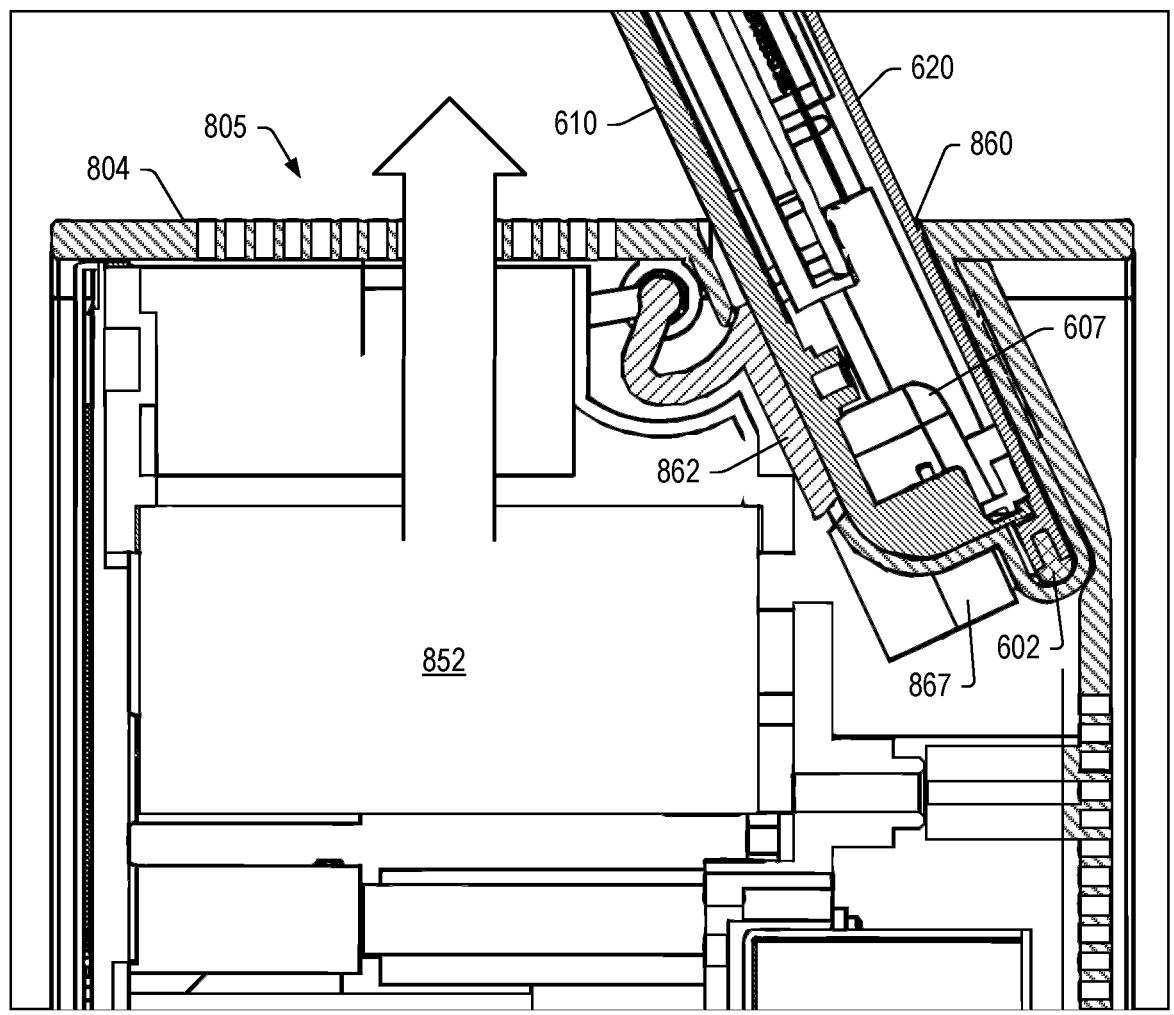
FIG. 4 is a cross-sectional cutaway view of a portion of the system of FIG. 1.

FIG. 4 shows a cross-sectional view of a portion of the system 100 that includes a portion of the stand 400 and a portion of the base 800. In the example of FIG. 4, the base 800 is shown as including the one or more fans 852 where the side 804 includes one or more openings 805 for movement of air driven by operation of the one or more fans 852. In the example of FIG. 4, the base 800 is shown as including the slot 860 and a slot cover flap 862 that can pivot about an axis to rotate downwardly responsive to force applied thereto via the edge 602 of the second portion 600 of the stand 400. In the example of FIG. 4, the edge 602 is shown as being formed by a bumper such as an elastomeric material that can provide for one or more of shock absorbing and increased friction (e.g., anti-sliding). As shown, the second portion 600 can include various features such as circuitry, etc., disposed between the sides 610 and 620. As mentioned, the base 800 can include one or more contacts that can be, for example, electrical contacts that can contact corresponding electrical contacts of the second portion 600, for example, proximate to the edge 602.

In the example of FIG. 4, the flap 862 may be biased in the closed position, for example, using one or more springs. For example, consider a torsion spring that may be disposed about an axle that defines a rotational axis of the flap 862 such that force applied to the flap 862 by the second portion 600 can cause the flap 862 to rotate downwardly to expose the slot 860. In such an example, upon removing the second portion 600 from the slot 860, the spring may cause the flap 862 to return to its closed position to prevent debris, etc., from entering the slot 860. While a spring is mentioned, one or more magnets may be utilized, for example, to generate a magnetic force that may operate akin to that of the aforementioned spring. As shown in the example of FIG. 4, the flap 862 can include slanted end that can mate with a slanted edge of the top side 804 of the base 800 at the slot 860, which may help to position the flap 862 in the closed position such that the exposed surface of the flap 862 is substantially flush with the top side 804 of the base 800.

In the example of FIG. 4, the second portion 600 can be physically stabilized in the base 800 via one or more features. For example, the base 800 can include a support piece for one or more prongs 867 that extend into a slot space for receipt by one or more sockets 607 of the second portion 600.

Figure 5:
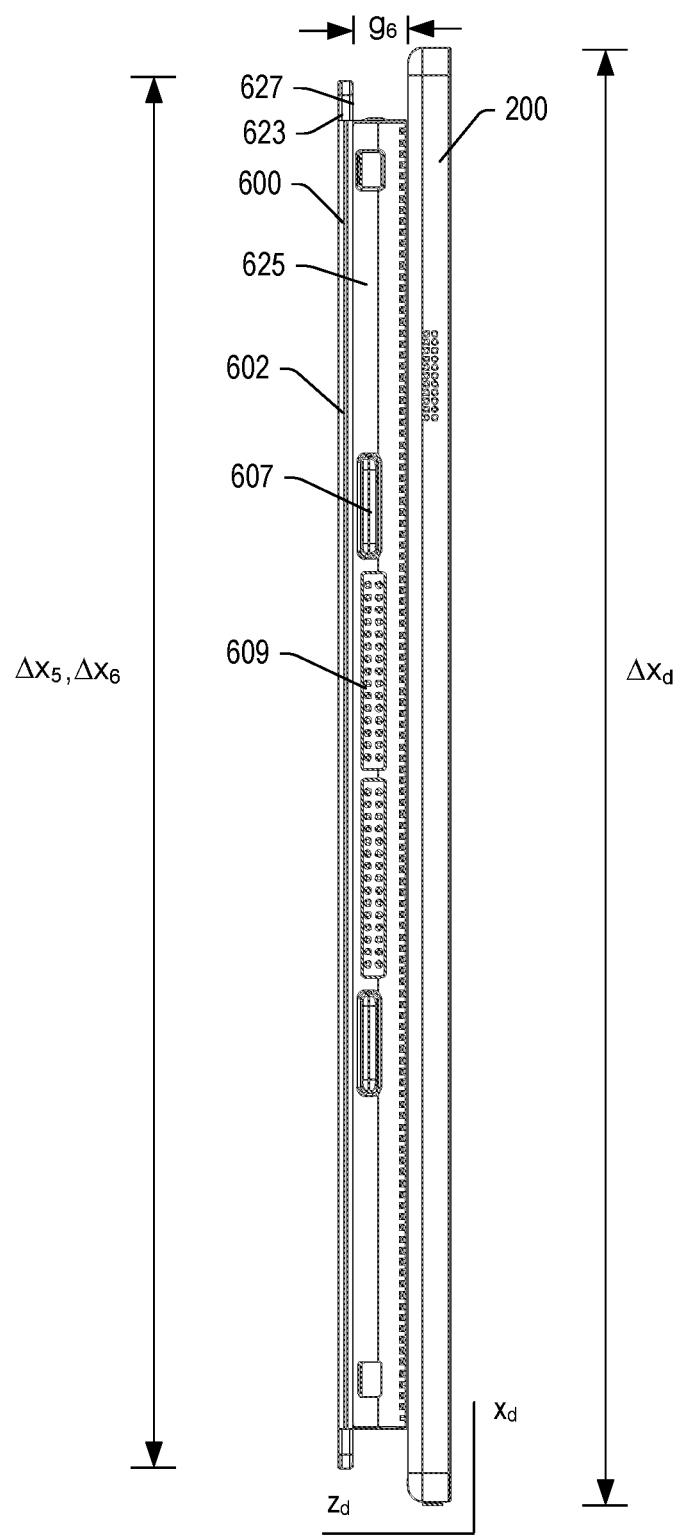
FIG. 5 is an end view of a portion of the system of FIG. 1.

FIG. 5 shows a side view of the display housing 200 and the stand 400 where the edge 602 of the second portion 600 of the stand 400 is visible and shown to include, for example, the one or more sockets 607 (see, e.g., FIG. 4) and one or more contacts 609. In such an example, the base 800 can include the support piece 867 for the one or more prongs (see, e.g., FIG. 4) that can be received at least in part by the one or more sockets 607, which may provide for physical stability and for alignment of the one or more contacts 609 with one or more corresponding contacts of the base 800. As an example, the base 800 may be a dock for the stand 400 and display housing 200.

As shown in FIG. 5, the stand 400 can be substantially planar and the display housing 200 can be substantially planar where the stand 400 and the display housing 200 can be stacked (e.g., in parallel planes) and where the turntable 300 allows the stand 400 to rotate while stacked. In the example of FIG. 5, a thickness of the second portion 600 and a thickness of the display housing 200 may be defined using the $z_d$ coordinate axis as shown in FIG. 3. In the example of FIG. 5, the second portion 600 is shown as being thicker than the display housing 200 and the second portion 600 is shown as being of a lesser dimension along the $x_d$ coordinate axis than the display housing 200 (see, e.g., $\Delta x_5$ and $\Delta x_6$, which can be dimensions of the first portion 500 and the second portion 600 of the stand 400, respectively). For example, when viewing from a position in front of the display surface 240, the stand 400 may be hidden behind the display housing 200 such that the overall $x_d$ and $y_d$ dimensions (e.g., area) are determined by the size of the display housing 200. As shown, the side 620 may be defined by a plate or cover 623 of the second portion 600 that may extend or overhang a housing 625 of the second portion 600 such that a user may contact the plate or cover 623 to rotate the second portion 600 outwardly away from the display housing 200. For example, a gap, $g_6$, can exist between the plate or cover 623 of the second portion 600 and the display housing 200 such that a user can insert a finger and contact the plate or cover 623 at a side 627. In such an example, the user may then apply force to rotate the second portion 600 outwardly from the display housing 200 where the first portion 500 may remain flat and planar with the display housing 200. As to the size of the gap, $g_6$, as an example, it may be in a range of approximately 0.3 cm to approximately 2 cm (e.g., between the side 627 of the second portion 600 and the side 280 of the display housing 200).

Figure 6:
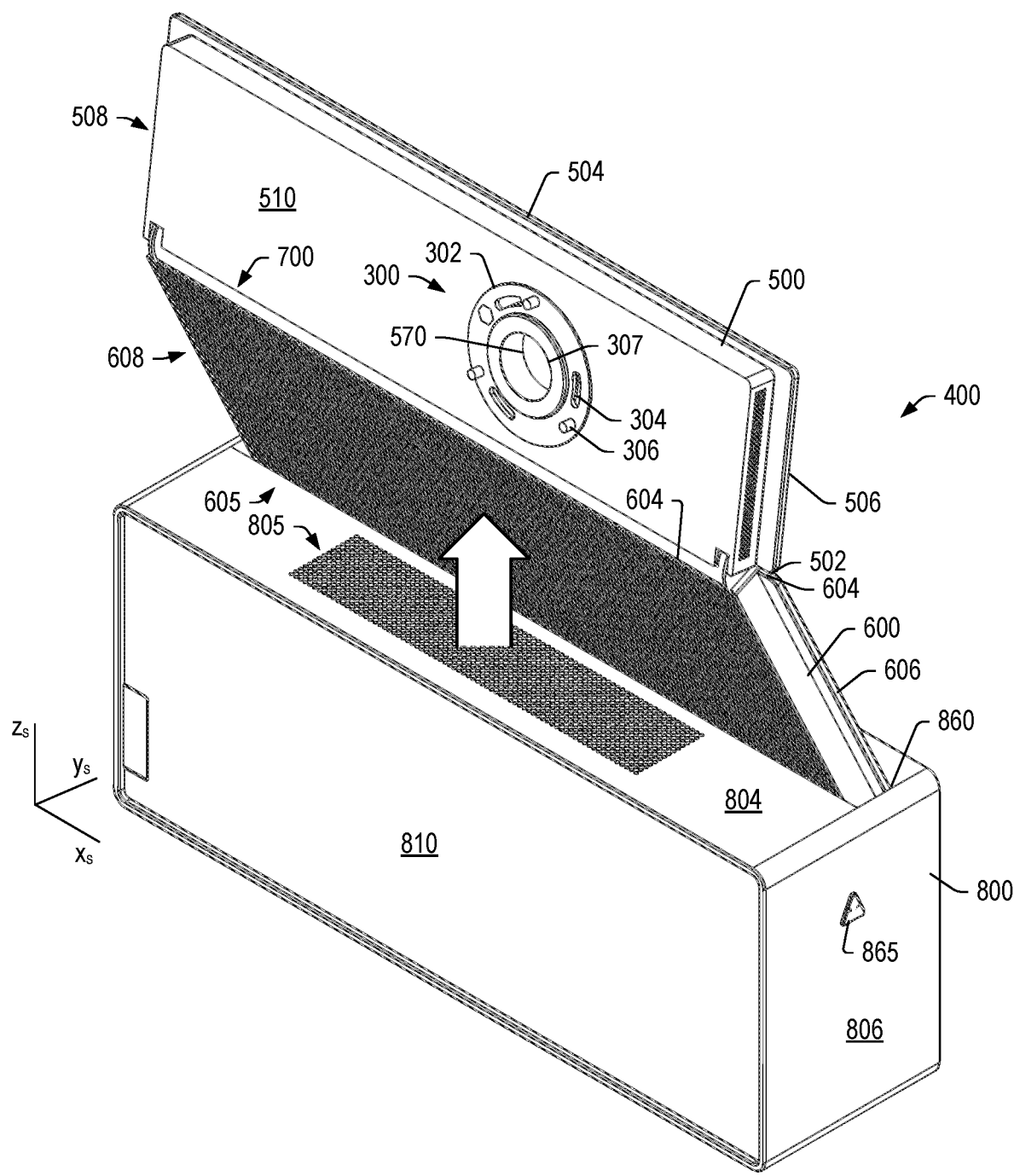
FIG. 6 is a perspective view of a portion of the system of FIG. 1.

FIG. 6 shows a perspective view of an example of the stand 400 and the base 800. In the example of FIG. 6, the first portion 500 includes edges 502, 504, 506 and 508 where the turntable coupling 300 is positioned with the bounds of the side 510 for coupling to various features of the display housing 200, for example, as shown in FIG. 2. The opening 270 of the display housing 200 can overlap with an opening 570, for example, to allow for passage of one or more wires. In the example of FIG. 6, the turntable coupling 300 includes a base fitting 302, arcuate slots 304, pegs 307 and an extension 307, which may be a bushing that extends outwardly from the side 510, for example, to be received at least in part in the opening 270 of the display housing 200. In such an example, the pegs 306 and the extension 307 can provide for physical support, for example, to bear the mass of the display housing 200 in the portrait orientation, the landscape orientation and transitions therebetween.

In the example of FIG. 6, the second portion 600 is shown as including edges 604, 606 and 608 where the edge 602 is disposed within the base 800. The second portion 600 is shown as including openings 605 that can be in fluid communication with air emanating from the openings 805 of the base 800, which may be fan driven air. Where the display housing 200 is coupled to the stand 400 via the turntable coupling 300 and the stand 400 is supported by the base 800, the display housing 200 may help to confine and/or direct air flow in a manner that helps to remove heat energy from circuitry within the stand 400 (e.g., within the second portion 600, etc.).

In the example of FIG. 6, the base 800 includes a release button 865, which may be actuated for release of one or more mating features between the second portion 600 and the base 800. For example, when a user desired to separate the stand 400 from the base 800, the user may press the release button 865 and then forcibly pull the second portion 600 out of the slot 860 of the base 800.

Figure 7:
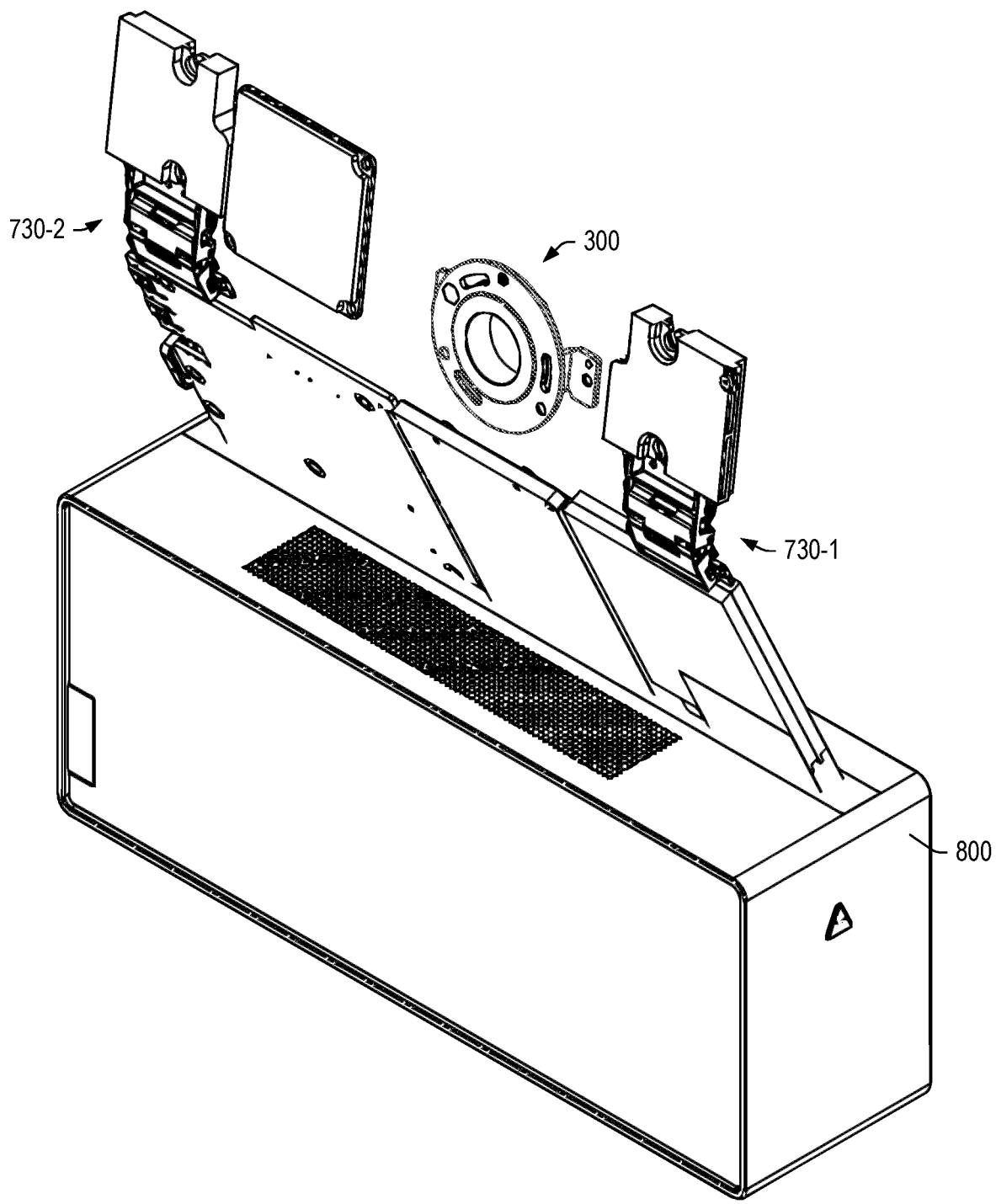
FIG. 7 is a perspective view of a portion of the system of FIG. 1.

FIG. 7 shows a perspective view of an example of various components of the turntable coupling 300 and the stand 400, including features of the hinge assembly 700. As shown, the hinge assembly 700 can include one or more hinges 730-1 and 730-2 that can couple the first portion 500 and the second portion 600. As shown in FIG. 7, the hinge 730-1 and the hinge 730-2 can be utilized to couple the first portion 500 and the second portion 600 using various fixtures (e.g., leafs, etc.). FIG. 7 shows the portions 500 and 600 with various components, covers, etc., removed, which allows for viewing other components such as, for example, circuitry, circuitry boards, etc.

As an example, the turntable coupling 300 may include rotatable joint components that are carried by the stand 400 where a rotatable portion may be coupled to the display housing 200 or the turntable coupling 300 may include rotatable joint components that are carried by the display housing 200 where a rotatable portion may be coupled to the stand 400. As an example, the turntable coupling 300 may be an intermediate sub-assembly that is disposed between the display housing 200 and the stand 400 in a manner that allows for rotation of the display housing 200 with respect to the stand 400. As an example, the turntable coupling 300 may include one or more types of material that provide for rotation. For example, consider a metal-to-metal approach where two metals (e.g., or alloys) can contact and allow for rotational sliding without excessive wear. Or, for example, consider one or more types of polymeric, ceramic, etc., bushings that may be utilized to facilitate rotation without excessive wear. As an example, a bearing-based approach may be utilized where roller bearings are set in a race or races such that alignment is maintained between components that allow for rotation of the display housing 200 with respect to the stand 400. As an example, one or more Lazy Susan types of turntable couplings may be utilized. As an example, the turntable coupling 300 can include one or more detents and/or other components that can control rotation limits, stops, etc. For example, consider a horizontal stop (e.g., for landscape) and a vertical stop (e.g., for portrait). As an example, one or more limiting and/or stopping features may help to assure that wires, cables, etc., that may extend from the stand 400 into the display housing 200 do not experience twisting but rather experience 90 degree clockwise and 90 degree counter-clockwise rotations over an approximately 90 degree rotational range.

Figure 8:
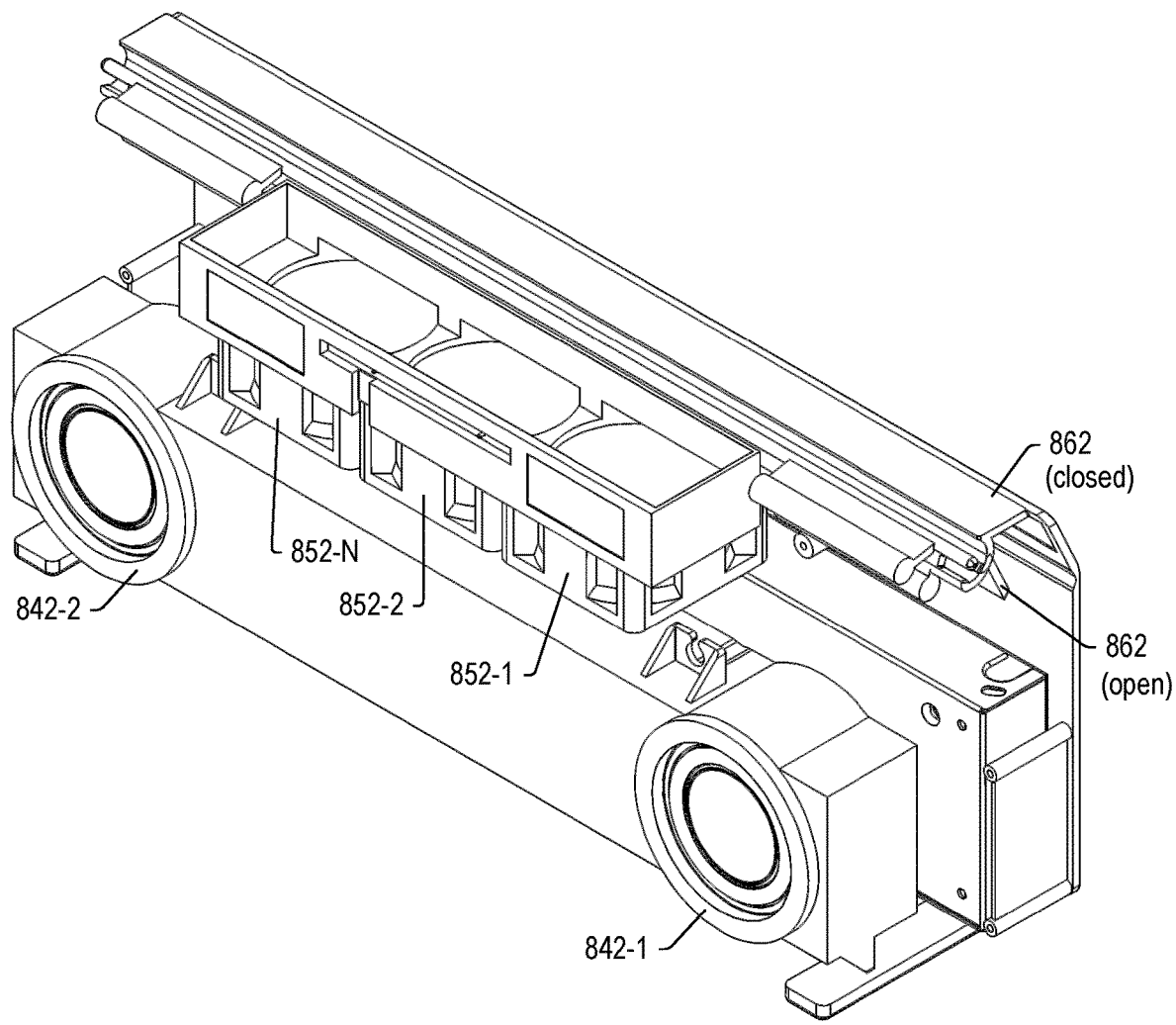
FIG. 8 is a perspective view of an example of a portion of the base.

FIG. 8 shows a perspective view of an example of various components of the base 800, including the flap 862, which is shown in a closed position and in an open position, the one or more speakers 842-1 and 842-2 and the one or more fans 852-1, 852-2 and 852-N. As shown, the speakers 842-1 and 842-2 can be forward facing while the fans 852-1, 852-2 and 852-N can be upward facing. For example, speaker axes can be directed outwardly from the front of the base 800 and fan axes can be directed upwardly from the top of the base 800.

As an example, one or more speakers may be removable from the base 800 and positioned separate from the base 800. In such an example, a user may increase a distance between the speakers for an improved surround sound experience. As an example, the base 800 can include one or more microphone where, for example, the base 800 may operate akin to a wireless microphone/speaker set or headset for a cellular phone, etc. As an example, when the stand 400 is supported by the base 800, features of the base 800 may be prioritized such that, for example, one or more microphones and/or one or more speakers of the base 800 are utilized rather than corresponding features of the display housing 200 and/or the stand 400.

Figure 9A:
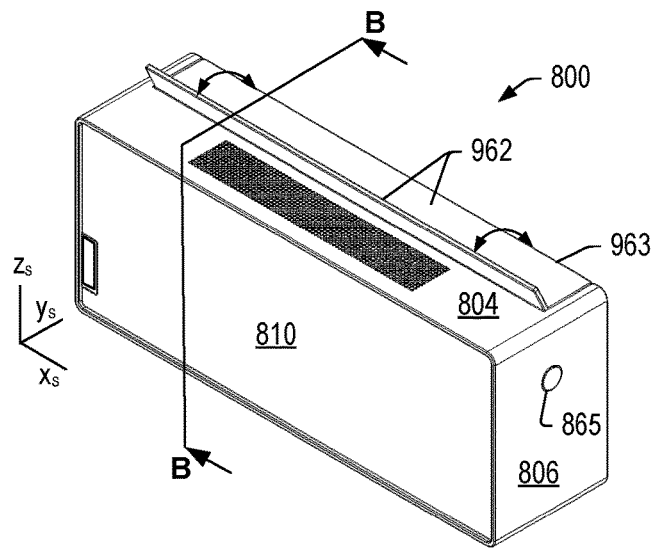
FIG. 9A, FIG. 9B and FIG. 9C are a series of views of an example of a base.
Figure 9B:
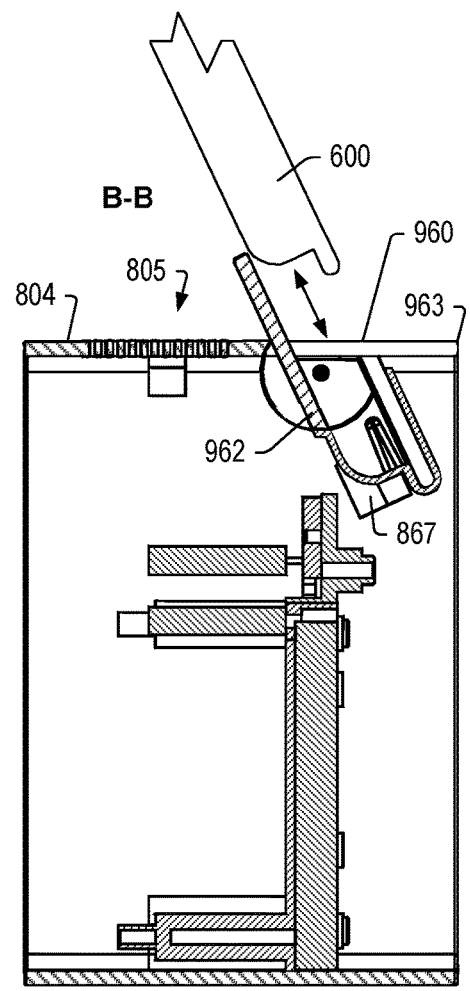
Figure 9C:
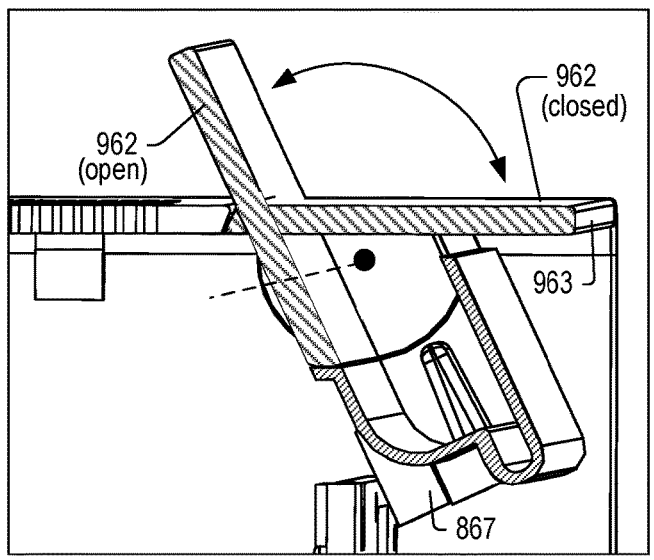

FIG. 9A shows a perspective view of an example of the base 800 as including a slot cover flap 962 that can transition from a closed position to an open position and vice versa, FIG. 9B shows a cross-sectional cutaway view of the base 800 along a cutting plane defined by a line B-B with the slot cover flap 962 in the open position to expose a slot 960 (e.g., without the front side 810 and the back side 820), and FIG. 9C shows a perspective cross-sectional cutaway view of a portion of the base 800 along the line B-B (e.g., without the front side 810 and the back side 820) where the slot cover flap 962 can transition from the closed position to the open position and vice versa. In the example of FIG. 9A, a Cartesian coordinate system is shown that may be utilized to describe one or more features. In the example of FIG. 9B, the cross-sectional cutaway view pertains to an $y_s,z_s$-plane view. As shown, the slot 960 is set toward a back edge of the base 800 as a center of gravity may be forward of the slot 960.

In the example of FIG. 9A, FIG. 9B and FIG. 9C, the flap 962 can be flush with the top side 804 in the closed position and can extend outwardly from the top side 804 in the open position such that it can help to physically support the stand 400 (see, e.g., the portion 600 of the stand 400 in FIG. 9B) and, for example, help guide a user when inserting the stand 400 into the slot 960 of the base 800.

As shown in FIG. 9A, FIG. 9B and FIG. 9C, the top side 804 can include the one or more openings 805 where, in the open position of the flap 962, the flap 962 does not block air flow upwardly from the one or more openings 805. As an example, the flap 962 may help to guide air flow toward the portion 600 of the stand 400, for example, for heat transfer purposes.

As an example, the flap 962 can include an edge 963 that can be exposed in the closed position such that a user may contact the edge 963 to manually rotate the flap 962 from the closed position to the open position. In such an example, the back side 820 of the base 800 may include a recessed portion such that a user can contact the edge 963 more readily. For example, the sides 806 and 808 may be flush with the edge 963 while a portion of the back side 820 of the base 800 is recessed or inset from the edge 963. In such an example, the height of the back side 820 may be sufficient to act as a stop surface for the flap 962 such that, in the closed position, the flap 962 is substantially flush and planar with the top side 804. As an example, the back side 820 may be inset slightly from the sides 806 and 808 where the back side 820 may contact the support piece for the one or more prongs 867 (see, e.g., one prong extending upwardly into the slot recess for engagement with one of the one or more sockets 607 of the stand 400 as shown in FIG. 5). As shown in FIG. 9B and FIG. 9C, an edge of the top side 804 may act as a stop surface for the flap 962 in the open position such that the flap 962 is disposed at an appropriate angle for guiding and/or supporting the stand 400.

As an example, the base 800 can include one or more ferromagnetic materials and/or magnets and the flap 962 can include one or more magnets and/or ferromagnetic materials such that magnetic force may be utilized to bias the flap 962 in the open position and/or in the closed position. For example, consider a magnet positioned near an axle that defines an axis of rotation of the flap 962. In such an example, as the flap 962 rotates, the magnet may engage another magnet or magnetic material to supply a magnetic attraction force. In such an example, the flap 962 may more readily stay in the open position and/or the closed position, as may be desired by a user. For example, such an approach may help to assure that the flap 962 does not inadvertently move if the base 800 is tilted, for example, while positioning the stand 400 and the base 800 such that the stand 400 can be received by the slot 960. As an example, a magnetic force may exceed a gravitational force (e.g., F=mg) for a mass of the flap 960 as it may rotate about its axis due to orientation with respect to gravity.

As an example, the flap 962 may include one or more magnets that can help guide the portion 600 of the stand 400 when inserting an end of the portion 600 into the slop 960. In such an example, the portion 600 may include a magnet where the magnets attract such that a haptic force may be experienced by a user during insertion and/or during removal.

As shown in FIG. 9B, the flap 962 can be disposed at a guide angle when in a fully open position such that the flap 962 can guide the stand 400 for receipt by the slot 960 at a proper angle.

Figure 10A:
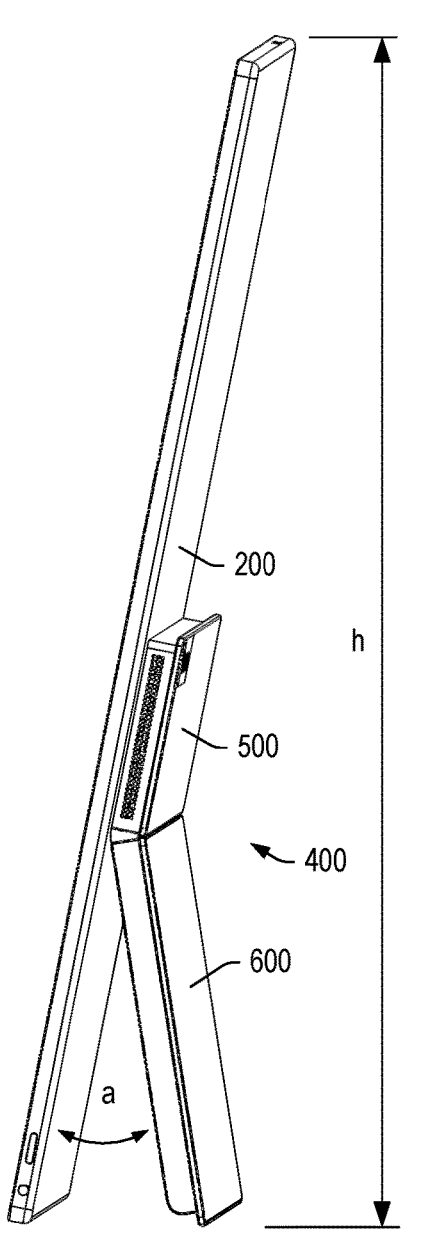
FIG. 10A, FIG. 10B and FIG. 10C are a series of perspective views of a portion of the system of FIG. 1.
Figure 10B:
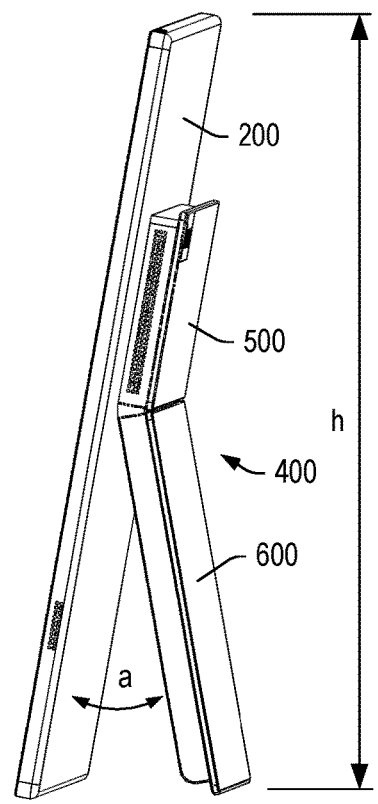
Figure 10C:
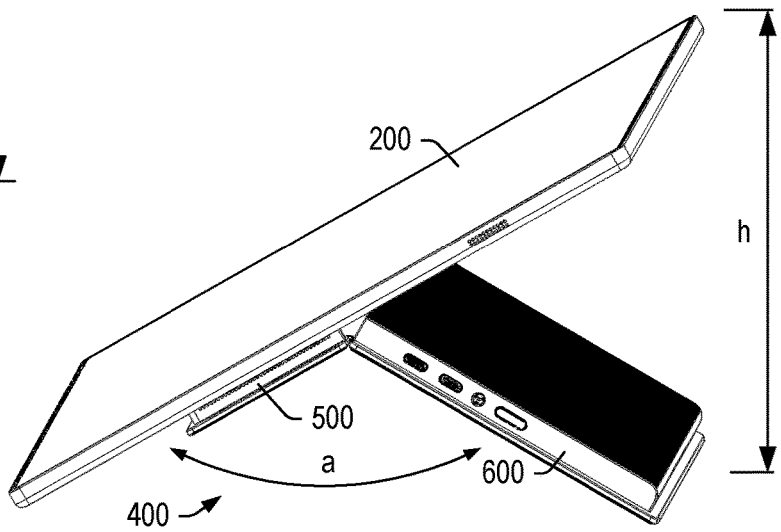

FIG. 10A shows a portrait orientation of the display housing 200 and the stand 400, FIG. 10B shows a landscape orientation of the display housing 200 and the stand 400, and FIG. 10C shows another landscape orientation of the display housing 200 and the stand 400. In each example, an angle, a, and a height, h, are shown. In the examples of FIG. 10A and 10B, the angle, a, may be the same while the height, h, differs; whereas, in the example of FIG. 10C, the angle, a, is greater and the height, h, is the shortest height. In the example of FIG. 10C, the stand 400 is oriented differently than in the examples of FIG. 10A and FIG. 10B. In FIG. 10C, the display housing 200 may be in a drawing orientation or drawing mode, which may be suitable for a content creator, for example, using a finger, a stylus, etc., to create content using a suitable content creation application (e.g., a drawing application, an editing application, etc.).

Figure 11:
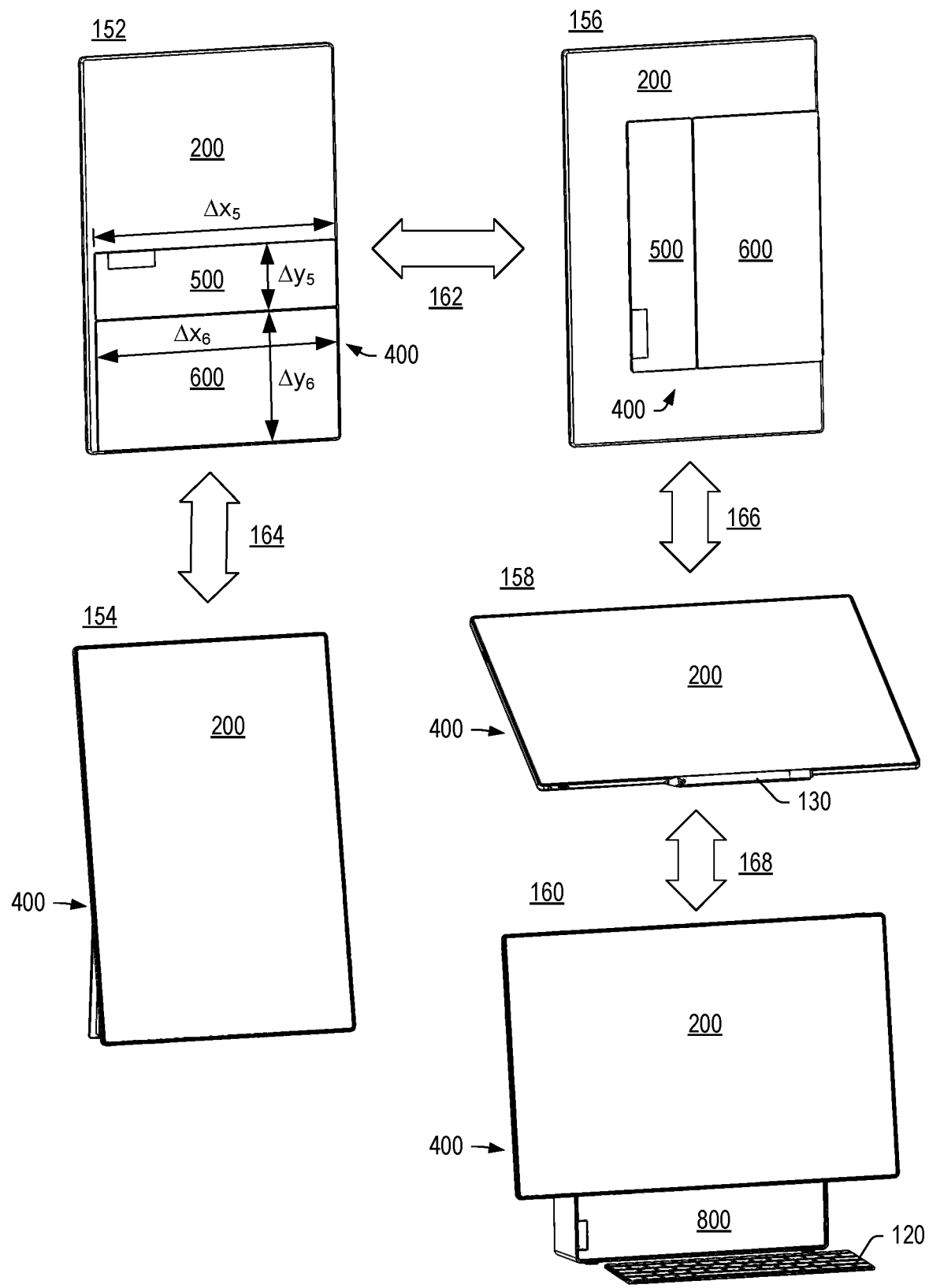
FIG. 11 is a series of views of examples of equipment that illustrate various of methods.

FIG. 11 shows various example arrangements 152, 154, 156, 158 and 160 of the display housing 200, the stand 400 and the base 800 along with various examples of methods 162, 164, 166 and 168 that can provide for transitioning from one arrangement to another arrangement using various features. In FIG. 11, the arrangement 152 is illustrated with various dimensions for the stand 400, including $\Delta x_s$, $\Delta y_s$, Δx₆, Δy₆, which correspond to the first portion 500 and the second portion 600, respectively. Such dimensions may be compared to the dimensions of the display housing 200 (see also, e.g., FIG. 5). As an example, the height Δy₆ of the second portion 600 may be approximately double the height Δy₅ of the first portion 500 and/or the height Δy₆ of the second portion may be approximately one-half the shorter dimension Δx_d of the display housing 200 and/or approximately one-third the longer dimension Δy_d of the display housing 200. Such an approach may provide for the second portion 600 to rotate away from the display housing 200, as hinged to the first portion 500, to support the display housing 200 in a portrait orientation and in a landscape orientation. As shown, comparisons may be made with the display housing 200 in the arrangement 152 and one or more other arrangements such as, for example, the arrangement 156 where the stand 400 is rotated by 90 degrees with respect to the display housing 200 compared to the arrangement 152. In the arrangements 152 and 156, as mentioned with respect to the example of FIG. 5, an overhang may exist, which may facilitate a user gripping the stand 400 or the display housing 200 and the stand 400 (e.g., for carrying for maneuvering, for setting up, etc.). As shown in FIG. 11, the portions 500 and 600 may be of a common width while being of differing heights. As explained, the portion 500 is positioned with respect to the turntable coupling 300 that couples the stand 400 and the display housing 200 while the portion 600 can pivot outwardly away from the display housing 200 such that the display housing 200 can be supported by the base 800, supported by an edge of the portion 600, etc.

The arrangement 152 shows the stand 400 as being in a portrait orientation with respect to the display housing 200 and the arrangement 154 shows the stand 400 as being in a landscape orientation with respect to the display housing 200 where the method 162 can provide for transitioning, for example, by rotating the stand 400 with respect to the display housing 200 or vice versa. As to the arrangement 154 (e.g., a portrait arrangement) and the method 164, the second portion 600 of the stand 400 can be angled such that a triangle is formed to support the display housing 200 on a support surface. As to the arrangement 156 (e.g., a landscape arrangement) and the method 166, the second portion 600 of the stand 400 can be angled such that a triangle is formed to support the display housing 200 on a support surface. As to the arrangement 160 and the method 168, the second portion 600 can be fit to the base 800 where the display housing 200 may be in a landscape orientation as shown in FIG. 4 or, for example, in a portrait orientation as shown in FIG. 1.

Figure 12A:
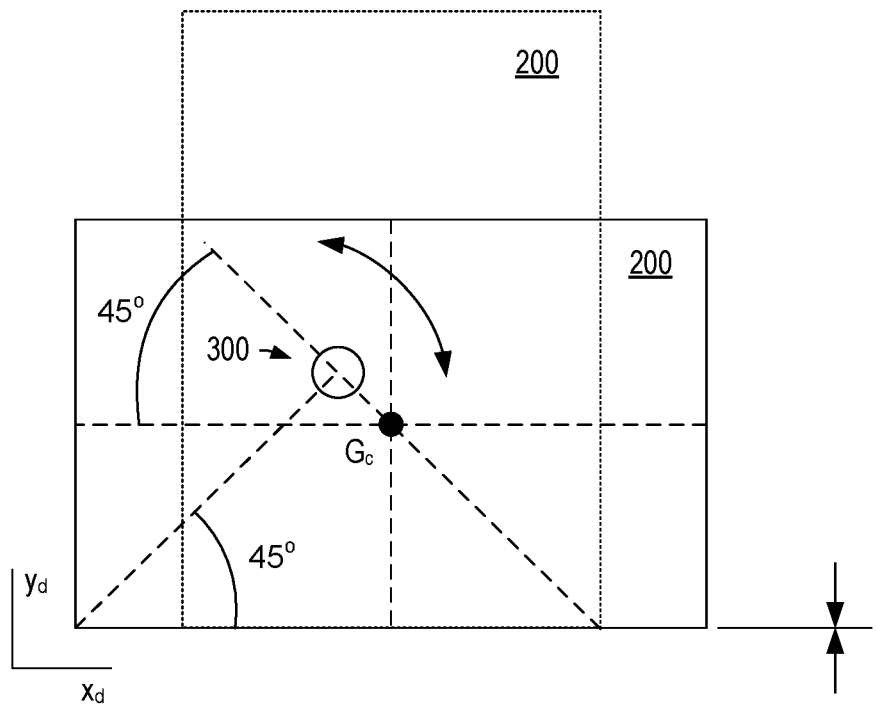
FIG. 12A and FIG. 12B are schematic plan views of an example of a rotatable display housing.
Figure 12B:
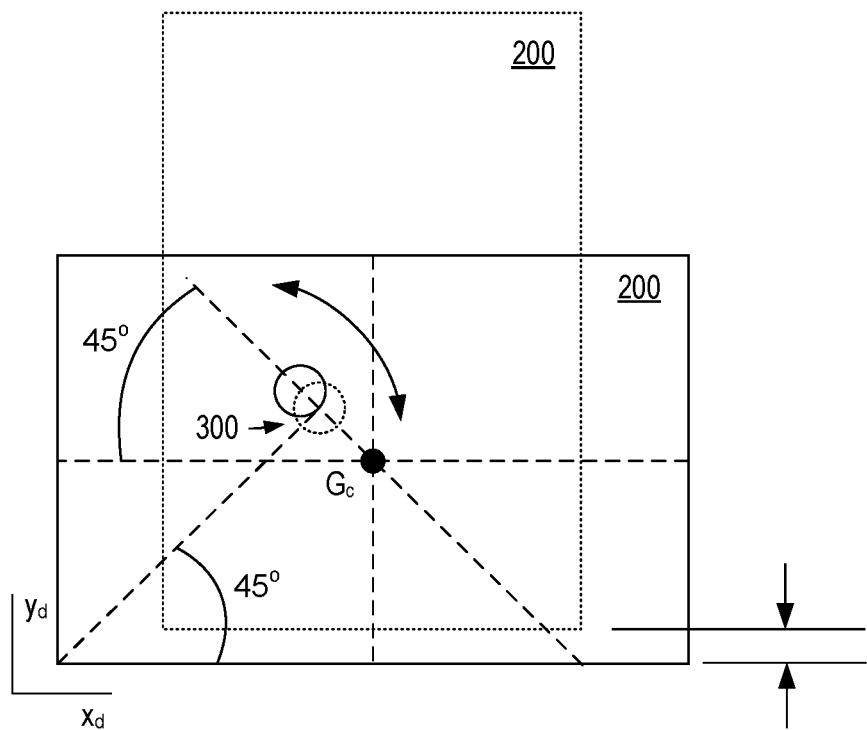

FIG. 12A and FIG. 12B show examples of orientations of the display housing 200 with respect to position of a center of a turntable coupling. As mentioned with respect to the example of FIG. 2, a 45 degree line may be utilized to define a location of a center of a turntable coupling where the turntable coupling can be offset from a geometric centroid. In the example of FIG. 12A, two 45 degree lines are shown, both being defined by the same corner and intersecting at the center of the turntable coupling where the lower edge of the display housing 200 is the same in both of the landscape orientation and the portrait orientation. In contrast, in the example of FIG. 12B, two 45 degree lines are shown where only one is defined by a corner such that the center of the turntable coupling is not at the intersection of the two 45 degree lines, rather it is shifted along one of the 45 degree lines. As such, in the example of FIG. 12B, the lower edge of the display housing 200 is not the same in both of the landscape orientation and the portrait orientation. Rather, the lower edge is lower in the landscape orientation than in the portrait orientation. In the example of FIG. 12A, one of the 45 degree lines can be at 45 degrees with respect to the geometric centroid ($G_c$), specifically, with respect to a horizontal line passing through the geometric centroid ($G_c$).

Figure 13A:
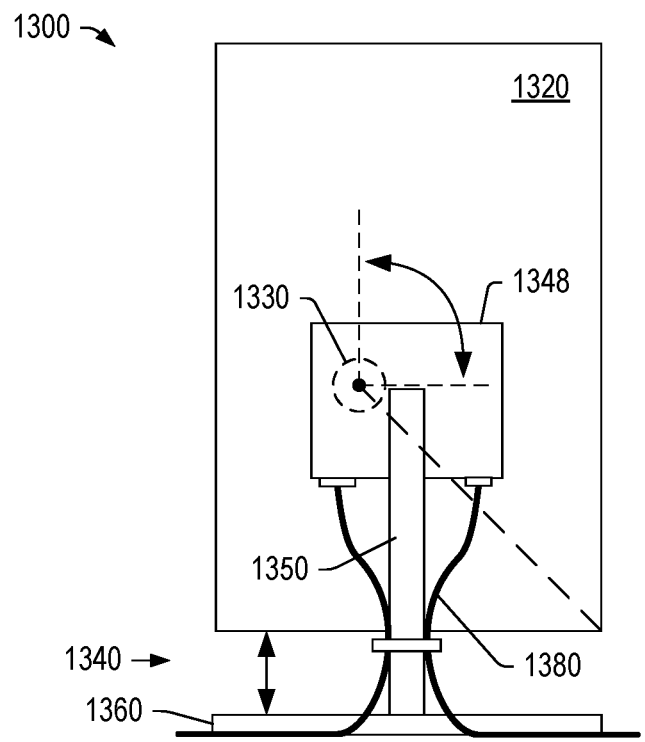
FIG. 13A and FIG. 13B are back side views of an example of a system that includes an example of a rotatable display housing.
Figure 13B:
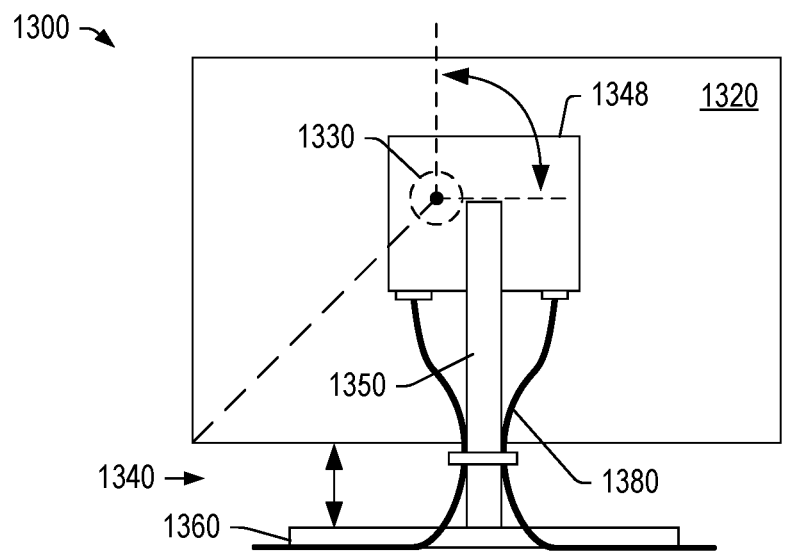

FIG. 13A and FIG. 13B shows an example of an assembly 1300 that includes a display housing 1320, which may be and/or include one or more features of the display housing 200. As shown, the assembly 1300 includes the display housing 1320, a turntable coupling 1330, a stand 1340 that includes a coupling assembly 1348, an arm 1350 and a base 1360, and one or more cables 1380. As shown, the display housing 1320 can be rotatable about an axis of the turntable coupling 1330 where the stand 1340 remains stationary. In such an approach, the one or more cables 1380 can remain stationary as well. In contrast, for a cable directly coupled to the rotatable display housing 1320, it must move as the display housing 1320 rotates, which may cause stress, strain, disconnection, etc., of the cable. In the example of FIG. 13A and FIG. 13B, the stand 1340 may be without a height adjustment and without a rotate mechanism; the mass on the turntable coupling may be isolated to be that of the display housing 1320 (e.g., and not the coupling assembly 1348); the centerline of the display housing 1320 and that of the stand 1340 may be aligned in the two different orientations (portrait of FIG. 13A and landscape of FIG. 13B); and, if a standardized mount is desired such as, for example, a VESA mount, it may be at an attachment region where the arm 1350 of the stand 1340 attaches to the coupling assembly 1348 (e.g., a bumped out portion of the assembly 1300 that extends outwardly from the display housing 1320). As an example, the arm 1350 may mount to the coupling assembly 1348 using a VESA or other standard mount where the arm 1350 may be removable such that the coupling assembly 1348 can be mounted to a wall, a different stand, etc. In such an example, the turntable coupling 1330 can provide for rotation of the display housing 1320 between portrait and landscape orientations where a centerline may be the same in both orientations and, for example, where two cameras are present (e.g., one along a long edge and one along a shorter edge of the display housing 1320), a camera may be positioned at the top of the display housing 1320 (e.g., optionally at the centerline).

As an example, a system can include a display housing that includes a display surface and edges that define a centroid; a stand that includes a first portion, a second portion and a hinge assembly that couples the first portion and the second portion; and a turntable coupling, offset from the centroid, that rotatably couples the first portion of the stand to the display housing. In such an example, the display housing can include four corners where distances from the four corners to a rotational axis of the turntable coupling differ. As an example, a rotational axis may be offset from a geometric centroid along an angle defined by two adjacent edges. For example, consider an angle of approximately 45 degrees. As an example, a rectangular (non-square) display housing may be rotatable to a portrait orientation and to a landscape orientation where a distance between the display housing may be approximately the same in the portrait orientation and the landscape orientation. As an example, a turntable coupling can be offset from a geometric centroid of a display housing along an approximately 45 degree angle defined between two adjacent, orthogonal edges of the display housing.

As an example, a display surface of a display housing can include a length and a width, where the length exceeds the width. In such an example, the display housing can include a lengthwise edge camera unit and a widthwise edge camera unit. For example, consider a camera centered along the lengthwise edge and another camera centered along the widthwise edge. In such an example, where the display housing is rotated to be in a portrait orientation or a landscape orientation, one of the cameras can be top and center for a suitable field-of-view (FOV) of a user (e.g., for videoconferencing, etc.).

As an example, a stand can be rotatable via a turntable coupling by 90 degrees with respect to the display housing. For example, consider the various arrangements of FIG. 11, which include the arrangements 152 and 156 where the method 162 can transition the stand 400 using the turntable coupling 300.

As an example, a first portion of a stand can be substantially planar and a second portion of the stand can be substantially planar where the second portion is adjustably pivotable with respect to the first portion via a hinge assembly, which may include one or more hinges.

As an example, a second portion of a stand can include opposing edges that include an edge proximate to a hinge assembly and a support edge. In such an example, the support edge can include an elastomeric material. For example, consider a rubber or rubberized (e.g., polymeric coated, etc.) support edge that can increase friction (e.g., coefficient of friction) with a support surface such that risk of sliding is reduced.

As an example, a display housing can include an opening, a first portion of a stand can include an opening, and a turntable coupling can include an opening, where the openings overlap to form a wire passage. For example, consider a turntable coupling that includes an opening that allows for passage of one or more wires such that circuitry of a display housing and other circuitry can be coupled and/or power and/or data supplied to circuitry of the display housing.

As an example, a system can include a processor and memory accessible to the processor. In such an example, the system may be an all-in-one computing device. As explained, a system may include a keyboard as may be part of a keyboard housing assembly. As an example, a stand and/or a display housing may include a coupling for storage of a keyboard. In such an example, the coupling may be physical and/or magnetic. As shown in the example of FIG. 1, the keyboard 120 is shown as being coupled (e.g., stored) on the stand 400.

As an example, a system can include a detector operatively coupled to a processor, where, responsive to receipt of a signal of the detector, the processor controls rendering to a display surface in one of a portrait mode and a landscape mode. As an example, a system can include a detector operatively coupled to a processor where, responsive to receipt of a signal of the detector, the processor controls rendering to the display surface in one of two landscape modes, for example, where one of the two landscape modes corresponds to a drawing mode (see, e.g., the example of FIG. 10C). As an example, a system can include a detector operatively coupled to a processor, where a display housing includes multiple camera units where, responsive to receipt of a signal of the detector, the processor controls activation of one of the multiple camera units.

As an example, a system can include a base, where the stand couples to the base. In such an example, the base can include at least one or more of a speaker, a fan, a processor, a connector, etc. As an example, a speaker may be a separable speaker that may be wired and/or wireless with or without a battery such that it may be positioned as desired by a user. As an example, a base may housing two or more speakers that can be positionable (e.g., consider a left speaker and a right speaker that may be removed from the base and positioned as desired).

As an example, a system can include a base where the base includes a slot that can receive a portion of a stand. In such an example, the stand can be coupled to a display housing via a turntable coupling such that, with the stand coupled to the base, the display housing can be rotatable to a desired orientation (e.g., portrait or landscape). As an example, a stand can include multiple portions where one of the portions is receivable by a slot of a base where one or more of the other portions can be adjustable via a hinge assembly with respect to the portion received by the slot of the base. As explained, a base can include a slot that receives a portion of a stand to physically support the stand where, for example, one or more electrical connections may be made when the portion is received by the slot.

As an example, a base can include a bottom surface where the base elevates a turntable coupling a distance from the bottom surface that is greater than a distance from a rotation axis of the turntable coupling to a corner of a display housing where the turntable coupling rotatably couples a stand and the display housing and where the stand is supported by the base.

As an example, a base can include a slot that removably receives a portion of an all-in-one computing device for support of the all-in-one computing device; and at least one electromagnetic component. For example, consider a base that includes one or more of a speaker, a fan, a processor, memory, a connector, a battery, etc. As an example, a base can include a slot and a slot flap where the slot flap may be positionable in an open position for access to the slot and in a closed position to cover the slot. As an example, a slot may include electrical contacts disposed within the slot and/or may include at least one support prong disposed within the slot. As to a support prong, a stand may include a prong receptacle or socket that can receive a prong when a portion of the stand is disposed in the slot.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 14:
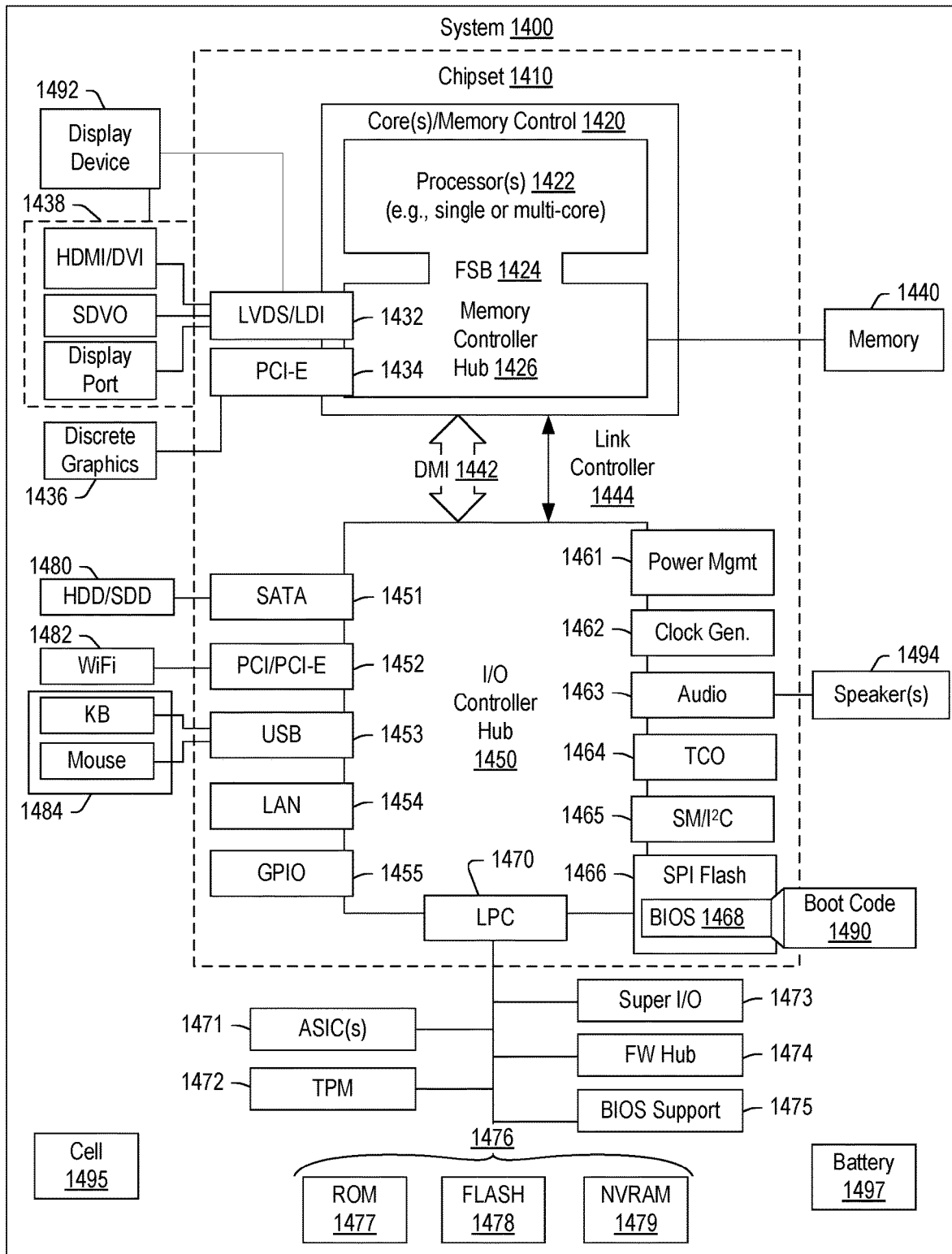
FIG. 14 is a diagram of an example of a system that includes one or more processors.

While various examples of circuits or circuitry have been discussed, FIG. 14 depicts a block diagram of an illustrative computer system 1400. The system 1400 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1400.

As an example, a device, a system, etc., may include one or more features of a IdeaCentre® "all-in-one" computing device (e.g., sold by Lenovo (US) Inc. of Morrisville, NC). For example, consider the IdeaCentre® A720 computing device, which includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 14, the system 1400 includes a so-called chipset 1410. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an I²C interface (see, e.g., the SM/I²C interface 1465), etc.

Although examples of methods, devices, systems, etc., have been described in language specific to structural features and/or methodological acts, it is to be understood that the subject matter defined in the appended claims is not necessarily limited to the specific features or acts described.

Rather, the specific features and acts are disclosed as examples of forms of implementing the claimed methods, devices, systems, etc.

What is claimed is:

1. A system comprising:
   a rectangular display housing that comprises a display surface and edges that define centerlines that intersect at a centroid;
   a rectangular stand that comprises a first portion, a second portion and a hinge assembly that couples the first portion and the second portion, wherein the first portion is substantially planar and wherein the second portion is substantially planar and wherein the second portion is adjustably pivotable with respect to the first portion via the hinge assembly; and
   a turntable coupling, offset from the centerlines and the centroid, that rotatably couples the first portion of the rectangular stand to the rectangular display housing.

2. The system of claim 1, wherein the rectangular display housing comprises four corners and wherein distances from the four corners to a rotational axis of the turntable coupling differ.

3. The system of claim 1, wherein the turntable coupling is offset from the centroid along an approximately 45 degree angle defined between two adjacent, orthogonal edges of the edges of the rectangular display housing.

4. The system of claim 1, wherein the display surface comprises a length and a width, wherein the length exceeds the width.

5. The system of claim 4, wherein the rectangular display housing comprises a lengthwise edge camera unit and a widthwise edge camera unit.

6. The system of claim 1, wherein the rectangular stand is rotatable via the turntable coupling by 90 degrees with respect to the rectangular display housing to support the rectangular display in a portrait orientation and to support the rectangular display in a landscape orientation.

7. The system of claim 1, wherein the second portion comprises opposing edges that comprise an edge proximate to the hinge assembly and a support edge.

8. The system of claim 7, wherein the support edge comprises an elastomeric material.

9. The system of claim 1, wherein the rectangular display housing comprises an opening, the first portion comprises an opening, and the turntable coupling comprises an opening, wherein the openings overlap to form a wire passage.

10. The system of claim 1, comprising a processor and memory accessible to the processor.

11. The system of claim 6, comprising a detector operatively coupled to the processor, wherein, responsive to receipt of a signal of the detector, the processor controls rendering to the display surface in one of a portrait mode that corresponds to the portrait orientation and a landscape mode that corresponds to the landscape orientation.

12. The system of claim 10, comprising a detector operatively coupled to the processor wherein, responsive to receipt of a signal of the detector, the processor controls rendering to the display surface in one of two landscape modes, wherein one of the two landscape modes corresponds to a drawing mode.

13. The system of claim 10, comprising a detector operatively coupled to the processor, wherein the rectangular display housing comprises multiple camera units and wherein, responsive to receipt of a signal of the detector, the processor controls activation of one of the multiple camera units.

14. The system of claim 1, comprising a base, wherein the rectangular stand couples to the base.

15. The system of claim 14, wherein the base comprises at least one of a speaker and a fan.

16. The system of claim 14, wherein the base comprises a slot that receives the second portion to support the rectangular stand.

17. The system of claim 14, wherein the base comprises a bottom surface and wherein the base elevates the turntable coupling a distance from the bottom surface that is greater than a distance from a rotation axis of the turntable coupling to a corner of the rectangular display housing.

18. The system of claim 14, wherein the base comprises:
   a slot that removably receives a portion of the rectangular stand; and
   at least one electromagnetic component, wherein the at least one electromagnetic component comprises at least one of a speaker and a fan.

19. The system of claim 18, wherein the base comprises a slot flap, electrical contacts disposed within the slot and at least one support prong disposed within the slot.

* * * * *